(12) United States Patent
Hartmann

(10) Patent No.: US 9,950,486 B2
(45) Date of Patent: Apr. 24, 2018

(54) METHOD FOR PRODUCING A SOLE FOR A SHOE

(71) Applicant: Matthias Hartmann, Forchheim (DE)

(72) Inventor: Matthias Hartmann, Forchheim (DE)

( * ) Notice: Subject to any disclaimer, the term of this patent is extended or adjusted under 35 U.S.C. 154(b) by 69 days.

(21) Appl. No.: 14/954,103

(22) Filed: Nov. 30, 2015

(65) Prior Publication Data
US 2017/0151742 A1    Jun. 1, 2017

(51) Int. Cl.
*A43B 13/04* (2006.01)
*B29D 35/12* (2010.01)
*A43B 13/12* (2006.01)

(52) U.S. Cl.
CPC ............ *B29D 35/122* (2013.01); *A43B 13/04* (2013.01); *A43B 13/12* (2013.01)

(58) Field of Classification Search
CPC ..... A43B 13/12; A43B 13/125; A43B 13/127; A43B 13/04; A43B 13/181; B29D 35/122; B29D 35/142
USPC .......................................................... 36/28
See application file for complete search history.

(56) References Cited

U.S. PATENT DOCUMENTS

| | | | | |
|---|---|---|---|---|
| 5,787,609 A | * | 8/1998 | Wu ........................ | A43B 21/28 36/28 |
| 6,564,476 B1 | * | 5/2003 | Hernandez ........... | A43B 1/0009 36/103 |
| 2009/0013558 A1 | | 1/2009 | Hazenberg et al. | |
| 2012/0032989 A1 | | 2/2012 | Li et al. | |
| 2013/0031804 A1 | * | 2/2013 | Abshire ................ | A43B 7/1425 36/103 |
| 2013/0291409 A1 | * | 11/2013 | Reinhardt .............. | A43B 13/04 36/30 R |
| 2014/0022377 A1 | | 1/2014 | Kanaya | |
| 2016/0278481 A1 | * | 9/2016 | Le ........................ | A43B 13/188 |

FOREIGN PATENT DOCUMENTS

| | | |
|---|---|---|
| DE | 102012206094 A1 | 10/2013 |
| EP | 2649896 A2 | 10/2013 |
| WO | 01/01806 A1 | 1/2001 |
| WO | 2007082838 A1 | 7/2007 |

* cited by examiner

*Primary Examiner* — Ted Kavanaugh
(74) *Attorney, Agent, or Firm* — Lucas & Mercanti, LLP

(57) ABSTRACT

The invention relates to a method for producing a sole for a shoe, especially for a sports shoe, wherein the sole has at least a first section which consists of a first plastic material and has at least a second section which consists of a second plastic material, wherein the second plastic material is Expanded Thermoplastic Polyurethane. To obtain good wearing properties of the shoe the method includes the steps of: a) Producing the first section of the sole, wherein in the first section at least one recess is created which has an opening at an upper side of the sole and which is at least partially closed by a bottom region at a bottom side of the sole, wherein the recess has a defined shape in a top plan view; b) Producing of a laminar sheet made of the second plastic material; c) Cutting-out of an insert of the laminar sheet produced according to step b), wherein the insert is or forms at least a part of the second section of the sole, wherein the shape of the insert corresponds to the shape of the recess; d) Fixing the insert in the recess.

16 Claims, 3 Drawing Sheets

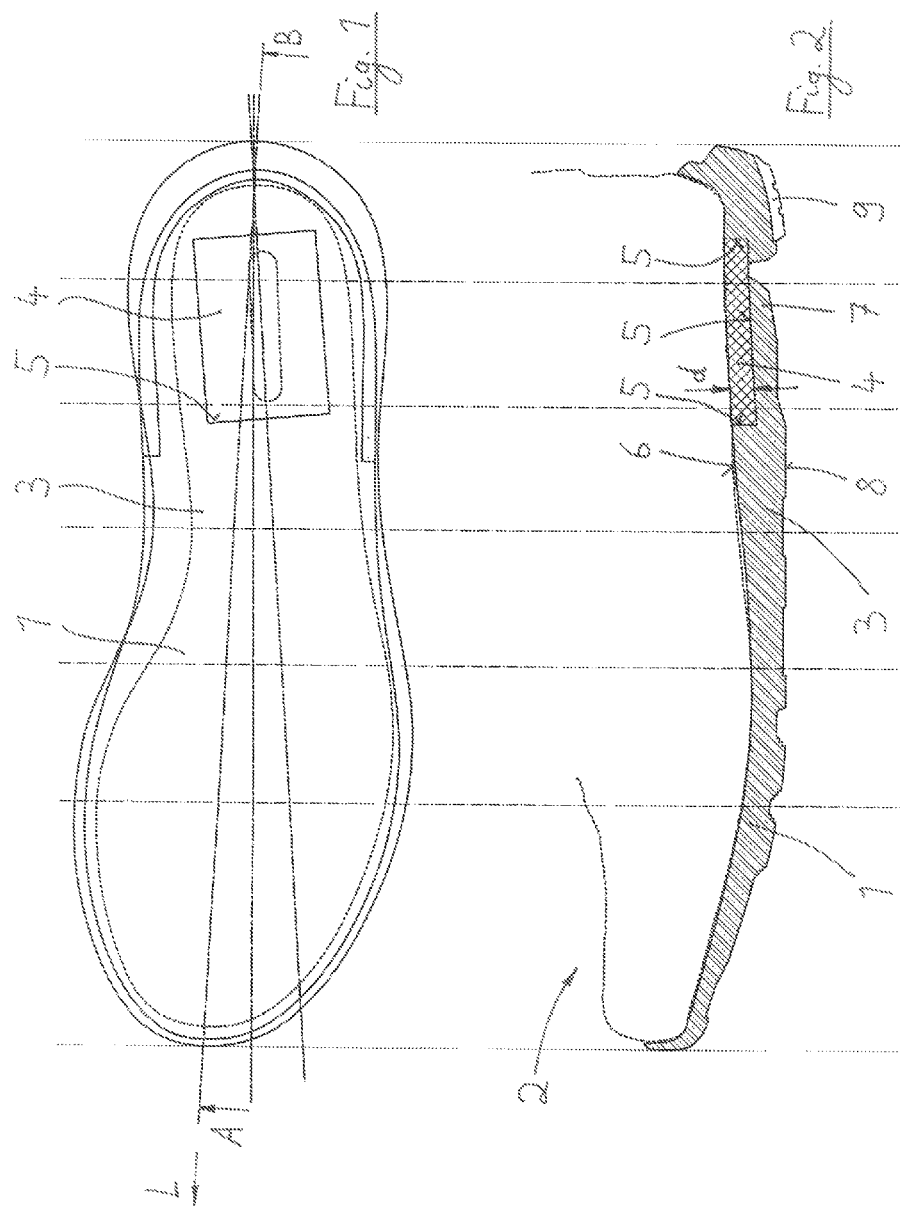

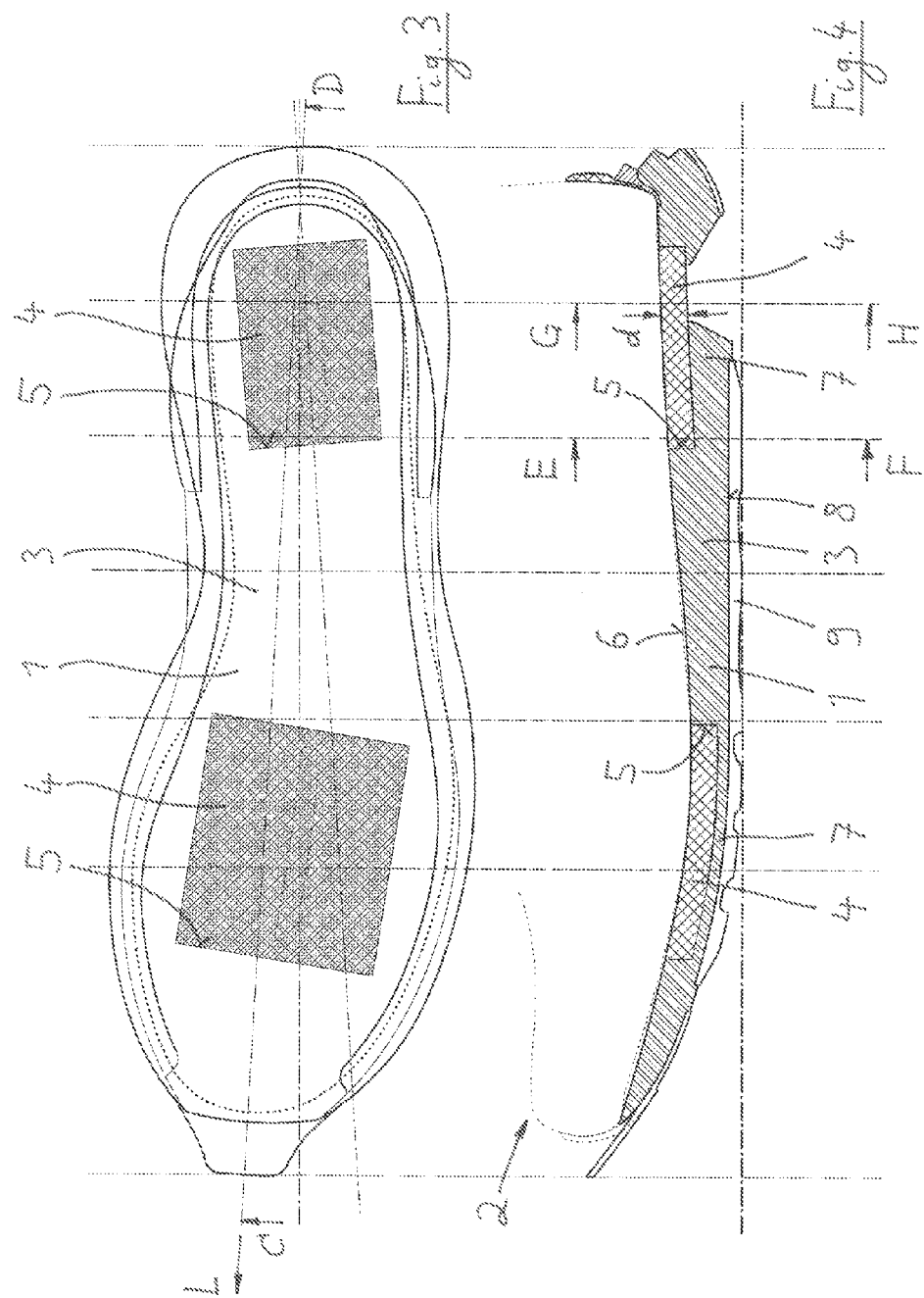

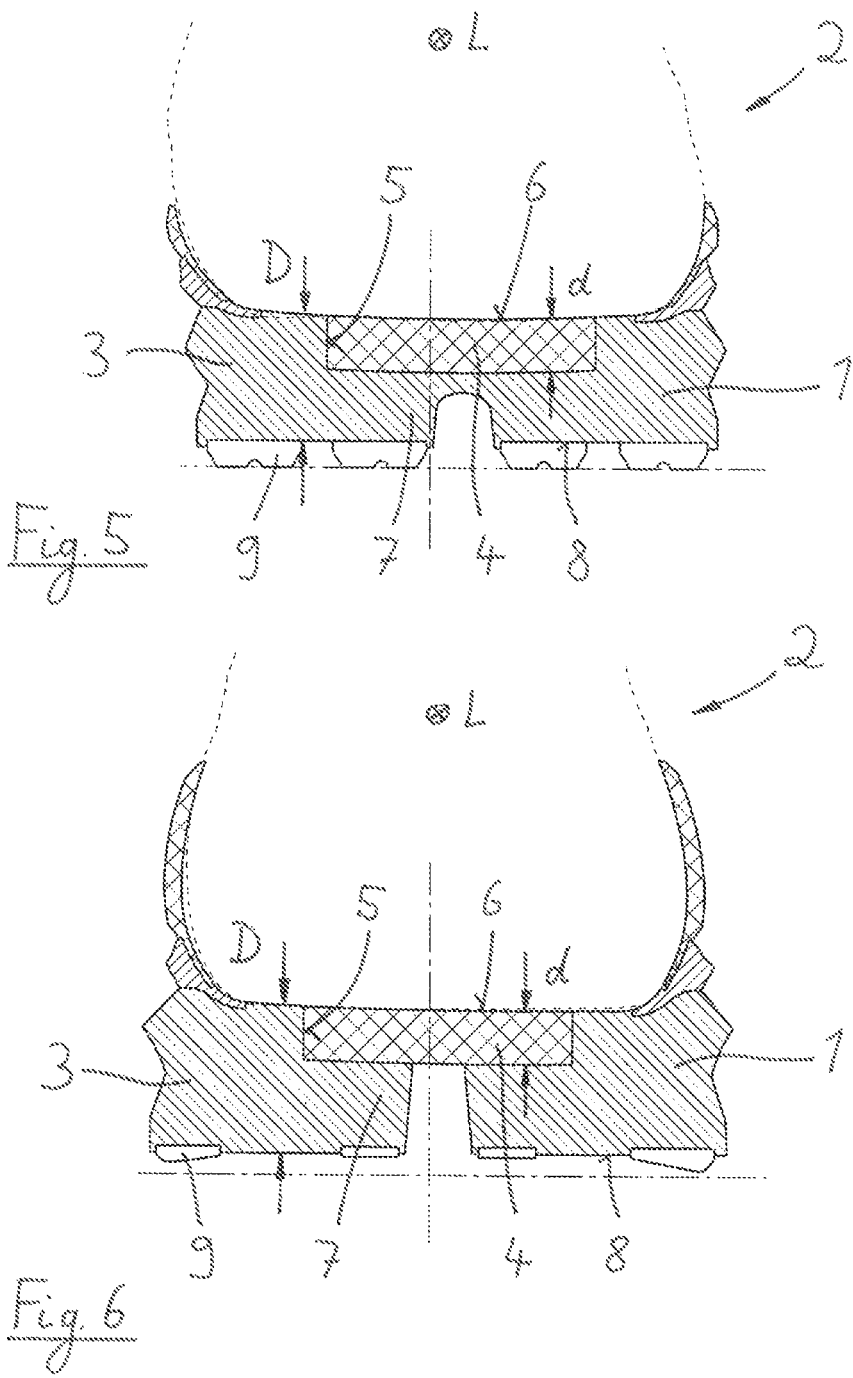

METHOD FOR PRODUCING A SOLE FOR A SHOE

BACKGROUND OF THE INVENTION

The invention relates to a method for producing a sole for a shoe, especially for a sports shoe, wherein the sole has at least a first section which consists of a first plastic material and has at least a second section which consists of a second plastic material, wherein the second plastic material is Expanded Thermoplastic Polyurethane (E-TPU).

Soles for shoes of the generic kind are well known in the art. In US 2000/0013558 A1 a shoe sole is disclosed which comprises of two different polymer materials, i. e. a first section is made of a first material and a second section is made of a second material. In WO 2007/082838 A1 a shoe sole is disclosed which specifically is made from Expanded Thermoplastic Polyurethane (E-TPU). Here, also detailed information is disclosed with respect to this type of plastic material; concerning the mentioned material E-TPU explicit reference is made to this document.

In DE 10 2012 206 094 A1 a shoe sole is disclosed which also uses the combination of two different materials, wherein one of the materials is Expanded Thermoplastic Polyurethane (E-TPU). The section consisting of E-TPU is quite large here.

With respect to the solution according to DE 10 2012 206 094 A1 it was found that the production costs of a respective sole for a shoe is quite high as the expensive E-TPU material is required in a significant amount.

BRIEF SUMMARY OF THE INVENTION

Thus, it is an object of the present invention to propose a method for the production of a shoe sole by which it becomes possible to obtain good wearing properties of the shoe while the required amount of E-TPU is limited as far as possible. Furthermore, a suitable method is aimed for which allows an economical use of the E-TPU material.

The solution of this object according to the invention is characterized in that the method comprises the steps of:
a) Producing the first section of the sole, wherein in the first section at least one recess is created which has an opening at an upper side of the sole and which is at least partially closed by a bottom region at a bottom side of the sole, wherein the recess has a defined shape in a top plan view;
b) Producing of a laminar sheet made of the second plastic material, i.e. made from E-TPU;
c) Cutting-out of an insert of the laminar sheet produced according to step b), wherein the insert is or forms at least a part of the second section of the sole, wherein the shape of the insert corresponds to the shape of the recess;
d) Fixing the insert in the recess.

The production of the first section of the sole according to above step a) takes place preferably by injection molding.

Beneficially, the cutting-out of the insert according to above step c) takes place by punching. So, it becomes possible in a very economical manner to use the laminar sheet of E-TPU and to machine is efficiently. If the shape of the insert is selected accordingly it becomes possible to reduce the scrape to a minimum and thus save money.

The fixation of the insert according to above step d) takes place preferably by gluing.

Preferably the method is carried out in such a manner that the upper side of the insert flushes with the upper side of the sole. So, a homogeneous surface is created.

Preferably, the recess is filled by the insert completely.

The laminar sheet is produced according to above step b) preferably with a constant thickness. Specifically, the laminar sheet can be produced according to above step b) with a thickness between 6.0 mm and 10.0 mm, preferably between 7.0 mm and 9.0 mm. This thickness was found specifically beneficial as it delivers good wearing properties but allows a very economical use of the E-TPU material.

The laminar sheet has preferably a thickness which is between 35% and 65% of the total thickness of the sole.

According to a preferred embodiment of the invention a recess is arranged in the rearfoot region of the sole, specifically in the rear third of the longitudinal extension of the sole.

Additionally or alternatively a recess can be arranged in the forefoot region of the sole, specifically in the first third of the longitudinal extension of the sole.

Preferably, the recess has a rectangular shape in a top plan view. This allows evidently a very cost efficient use of the E-TPU material.

The recess can have rounded edges at least at one end seen in longitudinal direction.

Preferably, as the second plastic material being the Expanded Thermoplastic Polyurethane (E-TPU) a material is used which has a density between 0.18 to 0.32 g/cm3. Furthermore, as the second plastic material being the Expanded Thermoplastic Polyurethane (E-TPU) a material can be used which has a tensile strength between 900 kPa and 1.500 kPa, preferably between 1.000 kPa and 1.400 kPa.

A suitable E-TPU material is available by Huntsman International LLC under the trademark "PearlFoam" or by BASF SE under the trademark "Infinergy".

According to the proposed method it becomes possible to efficiently produce a shoe sole with good wearing properties making use of the E-TPU material which is known as such. In spite of this the required amount of E-TPU material remains limited, so that a cost efficient production is possible.

BRIEF DESCRIPTION OF THE DRAWINGS

In the drawings embodiments of the invention are shown.

FIG. 1 shows a top plan view onto a shoe sole of a sports shoe according to a first embodiment of the invention, FIG. 2 shows the corresponding side view according to the section A-B of FIG. 1, FIG. 3 shows a top plan view onto a shoe sole of a sports shoe according to a second embodiment of the invention, FIG. 4 shows the corresponding side view according to the section C-D of FIG. 3, FIG. 5 shows the sectional view according to the section E-F of FIG. 4 and FIG. 6 shows the sectional view according to the section G-H of FIG. 4.

DETAILED DESCRIPTION OF THE PREFERRED EMBODIMENT

In FIGS. 1 and 2 a first embodiment of a sole 1 is shown. A shoe 2 is indicated; the sole 1 is part of the shoe 2. The sole 1 consists of a first section 3 and a second section 4.

The first section 3 consists of a suitable plastic material which is usually used for shoe sole, but not of E-TPU. A wide variety of polymer materials can be used here depending on the engineering properties of the material (e.g., tensile strength, stretch properties, fatigue characteristics, dynamic modulus and loss tangent). Examples are thermoplastic urethane or thermoset polymer materials (e.g. polyurethane, polyester, polyester polyurethane, polyether polyurethane). Also a variety of thermoplastic and thermoset polymer foam materials can be employed, including polyurethane and ethylvinylacetate (EVA).

The second section 4 consists of E-TPU. Insofar, reference is explicitly made to WO 2007/082838 A1.

The sole 1 has an upper side 6 and a bottom side 8. The sole 1 is here basically an intermediate sole, wherein an outer sole 9 is attached at the bottom side 8. Furthermore, a—not depicted—insole can be arranged at the upper side 6 of the sole 1.

At the production of the sole 1 at first the first section 3 is produced by injection molding. Here, a recess 5 is formed into the sole 1. More specifically the recess 5 enters into the upper side 6 of the sole 1 and is open to this side. At the bottom end the recess 5 is delimited by a bottom region 7 of the sole 1.

From a plane laminar sheet of E-TPU an insert (which is the second section 4 of the sole 1) is punched out which has a corresponding shape to the recess 5. As can be seen from FIG. 1 the shape of the recess 5 and thus also the shape of the insert 4 have here a rectangular form; it can also be provided that e.g. the shape is rounded in the rear end region of the recess 5 or insert 4.

In the embodiment according to FIGS. 1 and 2 a single insert 4 is placed in the rearfoot region of the sole 1 and more specifically in the rear third along the longitudinal direction L of the sole 1.

In the embodiment according to FIGS. 3 and 4 two E-TPU inserts 4 are placed in respective recesses 5 in the first section 3. One recess 5 is arranged in the forefoot region and one in the heel region (as in the case of the embodiment according to FIGS. 1 and 2).

In the case of FIGS. 3 and 4 the recesses 5 and inserts 4 have again a rectangular shape.

In the FIGS. 5 and 6 cross sectional views E-F and G-H according to FIG. 4 are shown. Here is can be seen that the thickness d of the insert 4 is preferably between 30% and 45% of the total thickness D of the sole 1.

The shoe upper of the shoe 2 is connected with known methods with the sole 1. Also an insole (not depicted) can be placed in the inner of the shoe 2 and on the upper side 6 of the sole 1.

REFERENCE NUMERALS

1 Sole
2 Shoe
3 First section
4 Second section (E-TPU)—insert
5 Recess
6 Upper side of the sole
7 Bottom region
8 Bottom side of the sole
9 Outer sole
d Thickness of the insert
D Total thickness of the sole
L Longitudinal direction

The invention claimed is:

1. A method for producing a sole for a shoe, wherein the sole has at least a first section which consists of a first plastic material and has at least a second section which consists of a second plastic material, wherein the second plastic material is Expanded Thermoplastic Polyurethane (E-TPU), wherein the method comprises the steps of:
  a) Producing the first section of the sole, wherein in the first section at least one recess is created which has an opening at an upper side of the sole and which is at least partially dosed by a bottom region at a bottom side of the sole, wherein the recess has a rectangular shape in a top plan view;
  b) Producing of a laminar sheet made of the second plastic material;
  c) Cutting-out of an insert of the laminar sheet produced according to step b), wherein the insert is or forms at least a part of the second section of the sole, wherein the shape of the insert corresponds to the rectangular shape of the recess in the top plan view; and
  d) Fixing the insert in the recess.

2. The method according to claim 1, wherein the production of the first section of the sole according to step a) of claim 1 takes place by injection molding.

3. The method according to claim 1, wherein the cutting-out of the insert according to step c) of claim 1 takes place by punching.

4. The method according to claim 1, wherein the fixation of the insert according to step d) of claim 1 takes place by glueing.

5. The method according to claim 1, wherein the upper side of the insert flushes with the upper side (6) of the sole.

6. The method according to claim 1, wherein the recess is filled by the insert completely.

7. The method according to claim 1, wherein the laminar sheet is produced according to step b) of claim 1 with a constant thickness (d).

8. The method according to claim 7, wherein the laminar sheet is produced according to step b) of claim 1 with a thickness (d) between 7.0 mm and 9.0 mm.

9. The method according to claim 7, characterized in that the laminar sheet is produced according to step b) of claim 1 with a thickness (d) between 6.0 mm and 10.0 mm.

10. The method according to claim 1, wherein the laminar sheet has a thickness (d) which is between 35% and 65% of the total thickness (D) of the sole.

11. The method according to claim 1, wherein a recess is arranged in the forefoot region of the sole in the rear third of the longitudinal extension of the sole.

12. The method according to claim 1, wherein a recess is arranged in the forefoot region of the sole in the first third of the longitudinal extension of the sole.

13. The method according to claim 1, wherein the recess has rounded edges at least at one end seen in longitudinal direction.

14. The method according to claim 1, wherein as the second plastic material being the E-TPU a material is used which has a density between 0.18 to 0.32 g/cm$^3$.

15. The method according to claim 1, wherein as the second plastic material being the E-TPU a material is used which has a tensile strength between 900 kPa and 1500 kPa.

16. The method according to claim 1, wherein as the second plastic material being the E-TPU a material is used which has a tensile strength between 1000 kPa and 1400 kPa.

* * * * *